(12) United States Patent
Li (10) Patent No.: US 7,881,477 B2
(45) Date of Patent: Feb. 1, 2011

(54) METHOD FOR KEY DISTRIBUTION IN A HIERARCHICAL MULTICAST TRAFFIC SECURITY SYSTEM FOR AN INTERNETWORK

(75) Inventor: Yunzhou Li, Lowell, MA (US)

(73) Assignee: Avaya Inc., Basking Ridge, NJ (US)

( * ) Notice: Subject to any disclaimer, the term of this patent is extended or adjusted under 35 U.S.C. 154(b) by 1225 days.

(21) Appl. No.: 11/493,130

(22) Filed: Jul. 25, 2006

(65) Prior Publication Data

US 2007/0110248 A1    May 17, 2007

Related U.S. Application Data

(63) Continuation of application No. 09/245,180, filed on Feb. 5, 1999, now abandoned.

(51) Int. Cl.
    H04L 9/08 (2006.01)
(52) U.S. Cl. .................. 380/278; 380/283; 713/163; 726/3
(58) Field of Classification Search .......... 380/283, 380/278; 713/163; 726/3
    See application file for complete search history.

(56) References Cited

U.S. PATENT DOCUMENTS

| | | | |
|---|---|---|---|
| 4,227,253 A | 10/1980 | Ehrsaam et al. | |
| 5,638,512 A | 6/1997 | Osman et al. | |
| 5,668,877 A | 9/1997 | Aziz | |
| 5,748,736 A | 5/1998 | Mittra | |
| 5,831,975 A | 11/1998 | Chen et al. | |
| 6,038,322 A | 3/2000 | Harkins | |
| 6,154,463 A * | 11/2000 | Aggarwal et al. | 370/408 |
| 6,195,751 B1 | 2/2001 | Caronni et al. | |
| 6,345,299 B2 | 2/2002 | Segal | |
| 2001/0034796 A1 | 10/2001 | Madruga et al. | |

OTHER PUBLICATIONS

Mitra, Suvo, "Iolus: A Framework for Scalable Secure Multicasting," SIGCOMM '97 Cannes, France, pp. 277-288.

(Continued)

Primary Examiner—Michael Pyzocha
Assistant Examiner—Paul Callahan
(74) Attorney, Agent, or Firm—Chapin IP Law, LLC; David W. Rouille, Esq.

(57) ABSTRACT

Multicast networks are partitioned into hierarchical security domains. Each security domain may comprise one or more lower security domains. Each security domain includes a security broker that distributes a group key and translates multicast data destined to the security domain, if necessary. A primary security broker at the second level of the hierarchical multicast system distributes the top security key to all peer members, including all peer security domain brokers to establish trust relationships. For each security domain boundary with security domain border routers, a multicast virtual link in configured that connects the security domain border routers and the security broker for the security domain to reduce the latency in forwarding multicast data. It can also make the backbone of the security domain contiguous so that multicast data can travel unchanged across the backbone. The multicast data is forwarded to the security domain through the security broker with security translation. A group key is distributed at each hierarchy level by exchange of Group request and Group reply messages. The rekey process is accomplished by multicasting Rekey Announcement messages, either regionally by a security broker, or globally by the group controller through the primary top regional security broker.

11 Claims, 3 Drawing Sheets

OTHER PUBLICATIONS

Canetti, R. and Pinkas, B., "A Taxonomy of Multicast Security Issues," Internet Draft, May 1998, 11 pages.

Ballardie, A., "Scalable Multicast Key Distribution," Request for Comments 1949, May 1996, 15 pages.

Harney, H. and Muckenhirn, C., "Group Key Management Protocol (GKMP) Specification", Request for Comments 2093, Jul. 1997 19 pages.

Harney, H. and Muckenhirn, C., "Group Key Management Protocol (GKMP) Specification", Request for Comments 2094, Jul. 1997 18 pages.

Kent, S. and Atkinson, R., "Security Architecture for the Internet Protocol", Obsoletes RFC 1825, Jul. 1998, 52 pages.

Kent, S. and Atkinson, R., "IP Authentication Header", Internet Draft, Jul. 1998, 19 pages.

Kent, S. and Atkinson, R. "IP Encapsulating Security Payload (ESP)", Internet Draft, Jul. 1998, 18 pages.

Maughan, et al., "Internet Security Association and key Management Protocol (ISAKMP)", Internet Draft, Jul. 3, 1998, 71 pages.

\* cited by examiner

METHOD FOR KEY DISTRIBUTION IN A HIERARCHICAL MULTICAST TRAFFIC SECURITY SYSTEM FOR AN INTERNETWORK

CROSS REFERENCE TO RELATED APPLICATIONS

This application is a continuation of application Ser. No. 09/245,180, filed Feb. 5, 1999, now abandoned.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to data communications. In particular, the present invention is related to hierarchical grouping of multicast traffic in an internetwork for improved, scalable, secure multicast data communications.

2. Description of the Related Art

Multicast data communications, or simply, multicast, is characterized by the transmission of data packets or frames from a source node to a plurality of destination nodes via an internetwork. If the plurality of destination nodes is sufficiently large, multicasting a data transmission significantly reduces the source node resources required to send the data transmission to each of the destination nodes, the network bandwidth consumed by the data transmission, and the latency associated with receiving the data transmission at each of the destination nodes. As pointed out in Mittra, S., Iolus: *A Framework for Scalable Secure Multicasting*, In Proceedings of ACM SIGCOMM '97, it is essential that multicast (i.e., group) data communications over the Internet are secure. However, given the primarily unicast and point-to-point nature of data communications over the Internet, much of the recent work on network security is inapplicable to multicast data traffic. Indeed, in a draft document by Canetti, B., et al., *A Taxonomy of Multicast Security Issues*, May, 1998, a number of security issues relating to multicast traffic is discussed. What is needed is an internet security protocol designed with multicast (i.e., group) data traffic in mind.

A proposed Internet Protocol (IP) security scheme set forth in a March, 1998 Internet Engineering Task Force (IETF) Network Working Group draft of "Security Architecture for the Internet Protocol", and recent work on multicast security, including "Scalable Multicast Key Distribution" (Request For Comments (RFC) 1949), "Group Key Management Protocol (GKMP) Architecture" (RFC 2094), "Group Key Management Protocol (GKMP) Specification (RFC 2093), and "A Secure, Scalable Multicast Key Management Protocol" (MKMP), indicate that multicast group data communication should use a single security association, i.e., a single key, for all multicast data traffic destined to the multicast group. However, these security schemes and security key distribution schemes are not scalable as the scope and size of the multicast group and/or network size increases. Furthermore, the prior art security schemes do not interoperate with proposed or existing IP multicast protocols such as set forth in the Multicast Extensions to OSPF specification (MOSPF—RFC 1584), the Distance Vector Multicast Routing Protocol (DVMRP) specification, and the Protocol Independent Multicast Sparse Mode (PIM) protocol specification. What is needed is a secure multicast scheme in which security associations may be partitioned and used only as needed in one or more portions of multicast group networks.

In some multicast data security schemes, such as Iolus, security associations for the same multicast group differ from one point to another point in the network, or from a higher level service providers to lower level service providers. For example, a securities trading service may encrypt data, e.g., stock trade and/or quote data, using a top level multicast group key, and multicast the data to several brokers. The brokers may, in turn, decrypt the multicast data using the top level multicast group key, again encrypt the data using new group keys, and then multicast the data to the ultimate destination nodes in the network.

The prior art multicast security mechanism described in Iolus divides multicast security groups into subgroups and allows security associations to differ from subgroup to subgroup. However, one disadvantage of this scheme is the latency incurred by decrypting and re-encrypting each packet of data as it is received and transmitted from subgroup to subgroup between a source node and the ultimate multicast destination nodes. Also, using local group or subgroups may result in improper execution of certain multicast data security applications that only identify and recognize a single multicast security group. What is needed, therefore, is a multicast traffic security scheme that avoids the problems described above in connection with the Iolus scheme.

BRIEF SUMMARY OF THE INVENTION

The present invention partitions multicast networks into multiple, hierarchical security domains. All security domains may share the same security association, while some security domains may have their own specific security associations, and yet other security domains may not use any security. A security broker acquires a security key from an upper level security domain in the security hierarchy and distributes that key or a local domain security key, and if necessary, performs multicast data translation between the upper level security domain and the local security domain. A primary top regional security broker is elected to distribute the security key for the highest level security domain to group members in other top regional security domains in the security hierarchy. A multicast data stream may transit multiple security domains at different levels of the security hierarchy. Multicast virtual links connect security domain border routers and security brokers from security domains at the same level in the security hierarchy so that a multicast data stream may be transmitted across security domains at different levels in the security hierarchy without the need for translation when traversing a lower level security domain. Another aspect of an embodiment of the present invention relates to discovering security brokers using Bootstrap mechanism, to distributing a security key at each level in the security hierarchy using Group Request (Join or Leave) and Group Reply (accept or reject) messages between the security broker and group members of a security domain, to rekeying by delivering Group Key Refresh messages to each individual member, and to enforcing global identical secure encapsulation by multicasting Rekey Announcement messages.

BRIEF SUMMARY OF THE SEVERAL VIEWS OF THE DRAWINGS

The present invention is illustrated by way of example and not limitation in the following figures, in which.

DETAILED DESCRIPTION OF THE INVENTION

1. Introduction

Described herein is a method and apparatus that hierarchically groups multicast traffic in an internetwork for improved, scalable, secure multicast data communications. In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention. For example, specific details are not provided as to whether the method is implemented in a switch as a software routine, hardware circuit, firmware, or a combination thereof.

Embodiments of the invention may be represented as a software product stored on a machine-readable medium (also referred to as a computer-readable medium or a processor-readable medium). The machine-readable medium may be any type of magnetic, optical, or electrical storage medium including a diskette, CD-ROM, memory device (volatile or non-volatile), or similar storage mechanism. The machine-readable medium may contain various sets of instructions, code sequences, configuration information, or other data. Those of ordinary skill in the art will appreciate that other instructions and operations necessary to implement the described invention may also be stored on the machine-readable medium.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Figure 1:
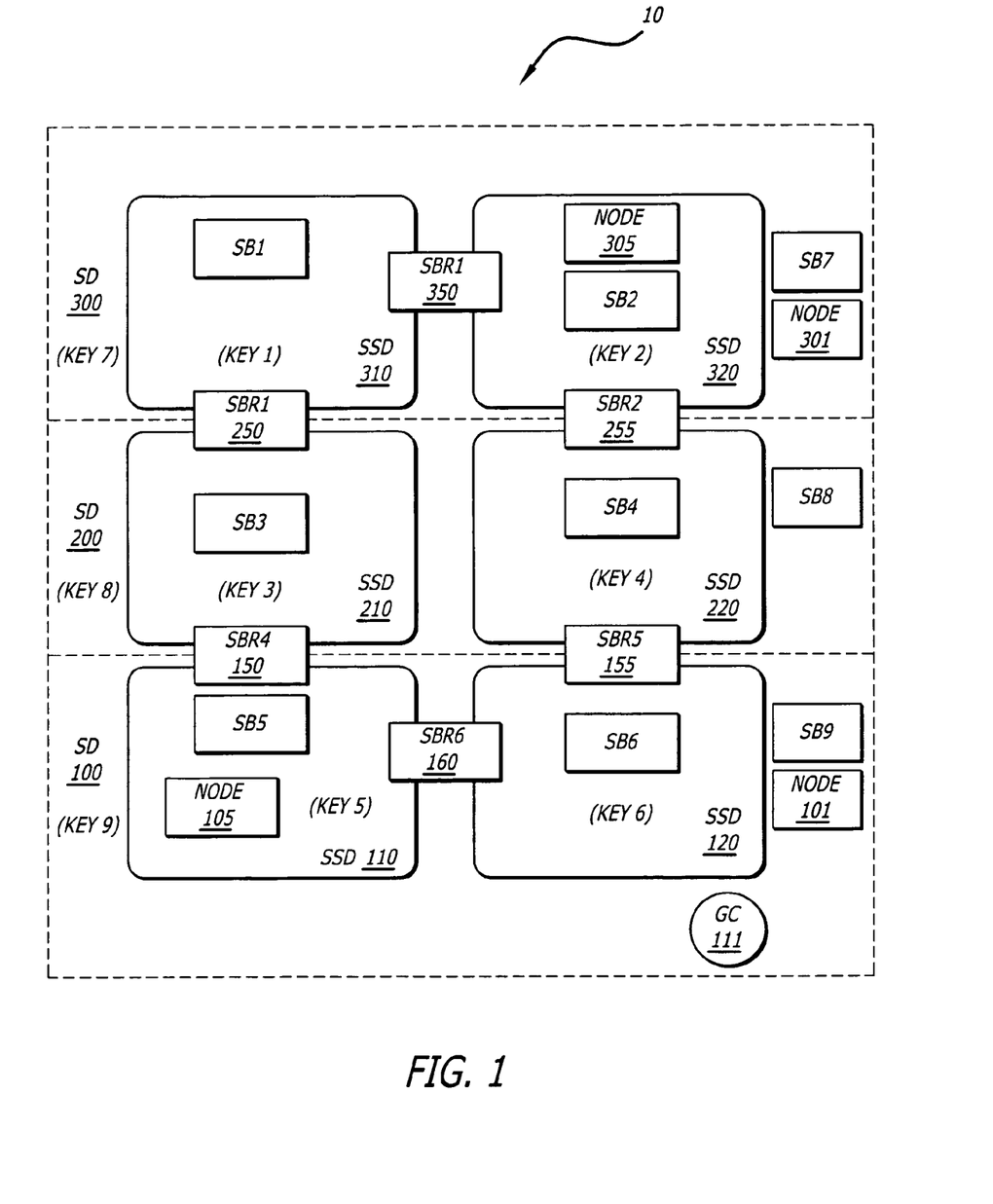
FIG. 1 is a block diagram of an embodiment of the present invention.
Figure 4:
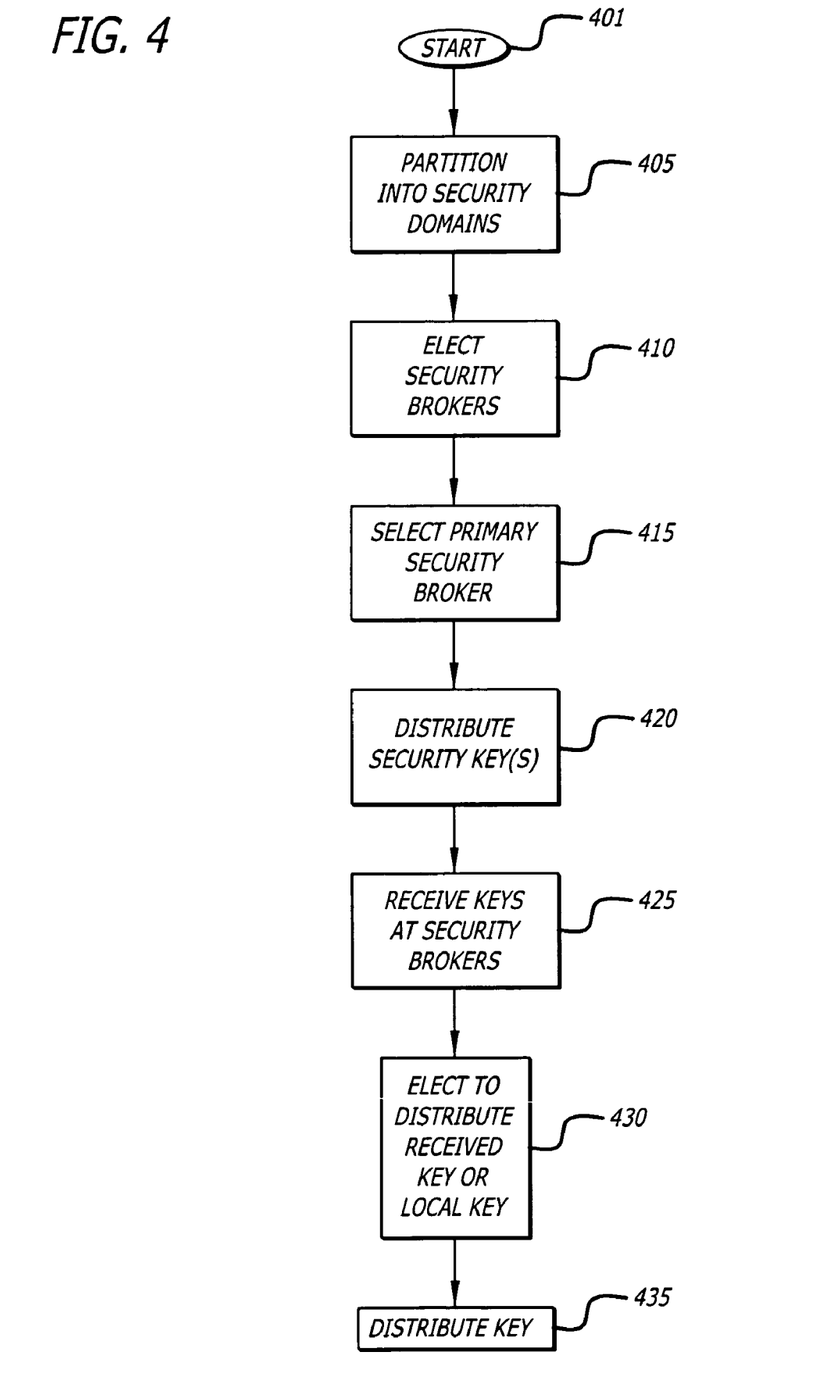
FIG. 4 is a flow diagram of an embodiment of the present invention.

With reference to FIGS. 1 and 4, the present invention partitions network 10 (e.g., Internet) into multiple, hierarchical security domains. For example, the top level security domain associated with network 10 is partitioned at 405 into three sub domains: domains 100, 200 and 300. Each of domains 100, 200 and 300 may be further partitioned. For example, the three domains are each partitioned into two sub domains 110, 120, 210, 220, 310 and 320 (labeled "SSD"). In one embodiment of the present invention, security domains are defined in accordance with routing domains defined by any one of a number of well known routing protocols such as OSPF, etc. Furthermore, all security domains may share the same security association, as that term is defined in and well understood by those of ordinary skill in the art. However, some security domains may have their own specific security associations, while some security domains may not need or use any security. In the internet 10, there is no security association across domains—internet 10 uses key 9, as does the top regional security domain 100. Thus, security sub-domain 310 uses key 1, security sub-domain 320 uses key 2, and so on. It should be noted with respect to internet 10 that only a few nodes or group members are shown in particular security domains in order to not obscure the details of the present invention. Furthermore, the interconnections or links between nodes and switches or routers within and across security domains are not shown in order to avoid obscuring the details of the present invention. However, it is understood that each security domain in network 10 is populated with, for example, routers, switches and nodes (e.g., group members) and that such devices are furthermore interconnected at appropriate points, e.g., border routers, between the security domains.

In general, each security domain elects a security broker at 410. For example, security sub-domain 310 elects security broker 1 (SB1), while security sub-domain 110 elects security broker 5. A security broker acquires a security key from an upper level security domain in the security hierarchy and distributes that key or a local domain security key, and if necessary, performs multicast data translation, i.e., encryption & decryption, between the upper level security domain and the local security domain. A primary security broker in a second level security domain in the security hierarchy is elected at 415 to distribute at 420 the group key for the upper (i.e., top or first) level security domain to multicast, or group, members in security domains at the second level in the security hierarchy, including other security brokers in the internet. For example, security broker 9 in security domain 100 is a security broker in a second level security domain that can distribute the security key for the security domain associated with internet 10 to group members, including security brokers 7 and 8, in respective security domains 300 and 200.

Partitioning the internetwork into multiple, hierarchical security domains in accordance with the present invention effectively results in a noncontiguous security backbone. That is, a multicast data stream may transit multiple security domains at different levels of the security hierarchy. For example, a multicast data packet transmitted by node 101 in security domain 100 may traverse security sub-domains 110, 120, 210, 220, 310 and 320 as it is forwarded to a destination node such as node 301 in security domain 300. Multicast virtual links provide for transmission of the multicast data stream across security domains at different levels in the security hierarchy. The multicast virtual links, or simply, virtual links, effectively connect security domain border routers and security brokers from security domains at the same level in the security hierarchy so that a multicast data stream can be transmitted without the need for translation when traversing a lower level security domain. When a multicast data stream is delivered to a security broker at the other end of a virtual link, the security broker translates and forwards the multicast data stream to a lower level security domain as needed. The use of a multicast virtual link reduces the latency in forwarding multicast data since the data is encapsulated and decapsulated (e.g., using generic routing encapsulation) between the security broker and the security border routers, instead of being encrypted and decrypted from security domain to security domain.

Another aspect of an embodiment of the present invention relates to security key distribution at each level in the security domain hierarchy. Security broker addresses are propagated to each router in a security domain through the Bootstrap mechanism. A group member then learns a relevant security broker address from Broker Advertisement messages of a router on the local link. Key distribution involves exchanging Group Request (Join or Leave) and Group Reply (accept or reject) messages between the security broker for a security domain and multicast, or group, members of that security domain. There are cases in which a multicast, or group, key is rekeyed regionally (i.e., within a security domain). The regional rekey process is accomplished by delivering Group Key Refresh messages to each individual member in the local security domain. Enforcing globally identical secure encapsulation is accomplished by multicasting a Rekey Announcement message to the entire group.

2. Multicast Security Hierarchy

2.1 Partitioning Multicast Security

Internet 10 can be viewed as a security domain at the top level of the hierarchical multicast security system of the present invention. This security domain can be partitioned at 405 into multiple security domains, which, in turn, may be partitioned into further security domains for enhanced scalability, as illustrated in FIG. 1. Typically, each of the second level security domains comprises one or more well known Autonomous Systems (AS). Security domains at the second level of the hierarchical security system, e.g., security domains 100, 200 and 300, may additionally be referred to as top regional security domains. One of the top regional security domains, 100, is elected as a primary top regional security domain that maintains a group controller 111, as described in further detail below.

In general, a multicast security domain excluding any multicast security sub-domains within the multicast security domain is referred to herein as the security backbone of the multicast security domain. The security backbone for the top level multicast security domain associated with internet 10 may be referred to as the top security backbone. As an example, security domain 100, excluding security sub-domains 110 and 120, is a security backbone for security domain 100. Furthermore, a multicast security domain, if not partitioned further, is a security backbone. Each security backbone provides a group key that is distributed to group members and no further. Recall security association may remain identical among various security domains, all sharing the same group key. However, the purpose of the present invention is to allow security association to vary from one security domain to another, and thus each security domain can have its security domain specific group key.

For each security domain, a security broker is elected at 410 from among group members (see section 2.2). Security sub-domain 310, for example, has elected a group member as security broker 1. The security broker is responsible for decrypting multicast packets received from a higher level security domain, encrypting the multicast packets with a local group key, if used, and delivering the encrypted multicast packets to group members. In the interne 10, security sub-domain 310 does have a local key 1 that differs from the key used by security domain 300, which uses key 7. Thus, security broker 1 is responsible for decrypting multicast packets received from security domain 300, using key 7, and encrypting the multicast packets using group key 1, and delivering the encrypted multicast packets to group members (not shown). At 420, the security broker is also responsible for distributing the group key 1 to all group members in its security domain. A router connecting the local security domain to another security domain is a security border router for the local security domain. As an example, router 250 is a security border router connecting security sub-domain 310 to security sub-domain 210. Border routers play an important role in forwarding and filtering multicast packets for the security domain of which they are members.

The security broker for the primary top regional security domain is referred to herein as the primary top regional security broker, or simply, top security broker, and is responsible for distributing, at step 420, group keys to security brokers in all other top regional security domains. Thus, security broker 9, being the security broker for the primary top regional security domain 100, distributes group keys to security brokers 7 and 8 in the other top regional security domains of internet 10. Security brokers in the other top regional security domains, e.g., security brokers 7 and 8, receive the key at 425, and elect to distribute, at step 430, the key received, or a local key. The brokers then distribute, at 435, the received key or group keys associated with their security domain, as elected in step 430, to sub-domain security brokers, e.g., security brokers 1 through 6. In this manner, trust relationships are established over internet 10.

Under existing multicast routing protocols, a security backbone may not be contiguous because a multicast data stream traveling the routing backbone may transit a security sub domain. To resolve this issue, multicast virtual links are configured across these security sub domains (see section 2.3). A multicast virtual link represents a hierarchy of multiple multicast sub domains, and a security broker is viewed as a group member on the virtual link. The multicast virtual link reduces latency for multicast packet forwarding because there is no decryption and encryption of the multicast packets forwarded over the link.

2.2 Security Broker, Security Border Routers and Security Domain Boundary

2.2.1 Security Broker

A security broker is a group key management entity of a security domain. The security broker operates between the security backbone of an upper or same layer security domain and the local security domain. For example, with respect to FIG. 1, security broker 9 operates between the security backbone of the security domain associated with interne 10 and security domain 100. The security broker manages one or more groups. The security broker translates multicast packets for these groups between the upper security domain and local security domain. At 425, the security broker acquires a group key from a security broker in an upper security domain, and thus is able to decrypt multicast packets received from the backbone of the upper security domain. For example, security broker 6 in security domain 120 acquires a group key from security broker 9 in security domain 100, directly or indirectly, and can, as a result, decrypt multicast packets received from the backbone of security domain 100. Security broker 6 distributes a local security domain key and thus local group members are able to decrypt packets encrypted by security broker 6 using the local security domain key.

2.2.2 Security Domain Boundary Instances

All edge routers in its security domain, e.g., routers at the border of an Autonomous System, should be configured as security domain border routers to form a physical security boundary so that there is no ingress/egress to/from the security domain to/from the backbone of another security domain other than through the security domain border routers. If the security association differs between an upper security domain and a local security domain, i.e., different keys are used, a security domain boundary instance, or simply, boundary instance, for the local domain is created. The boundary instance can be created and removed dynamically depending on the state of the boundary instance: uncertified, inherited and independent state. When a security broker acquires a group key from an upper security domain broker but employs a distinct group key in its local security domain, the boundary instance is in an independent state. In this case, for this particular group, all security domain border routers disable all interfaces associated with the local security domain and enable interfaces to a multicast virtual link. That is, the security domain border routers forward multicast packets destined for the group from the local security domain to the backbone of the upper security domain via the multicast virtual link as set forth in section 2.3.

When a security broker acquires a group key from an upper security domain security broker but does not use a distinct group key in the local security domain, that is, there is a shared security association between the security domains, the boundary instance is in an inherited state. In this case, all security domain border routers should forward key distribution messages for the group associated with the local security domain, upon being notified by a Router Alert option in the IP header of these messages, from the backbone of the upper security domain to the local broker via the virtual link. However, when a security domain border router thereafter receives a multicast packet and determines the packet is for the group associated with the boundary instance, it forwards the packet without translation according to the underlying multicast protocols.

When the security broker is not able to obtain the group key from the upper level security domain, the boundary instance is said to be in an uncertified state. All security domain border routers ignore the presence of the upper level security domain and forward multicast packets destined for the group associated with the local security domain without translation. The security domain border routers also ignore any group key distribution message associated with the particular group as instructed by the Router Alert option in the IP header of the message. In this case, this boundary instance is essentially nonexistent.

2.3 Multicast Virtual Link

2.3.1 Multicast Virtual Link Defined

With multicast virtual links across security sub domains, a security backbone becomes contiguous in terms of multicast routing. That is, a multicast packet is forwarded, without translation, across the security backbone to another security backbone, without traversing a security sub domain. A multicast virtual link is a logical communications link with multiple egress points from the local security domain defined by the security broker and border routers. It can be configured in various ways. In general, the multicast virtual link can be accomplished by generic routing encapsulation. If there is only a few border routers, the virtual link, according to one embodiment of the present invention, is a meshed unicast generic routing encapsulation tunnel. If there are numerous border routers, it can be configured and operate as a multicast generic routing encapsulation tunnel. If the bandwidth for a security domain should be minimized, a separate media, such as an ATM switch, may be built for the virtual link.

Security border routers execute a particular multicast protocol on the interface associated with the virtual link and all interfaces associated with the upper level security domain, and execute a different multicast protocol on all interfaces associated with the lower level security domain. When a security domain boundary instance for a group associated with the local security domain is in the independent state, the security domain border routers enable the virtual link interface but disable all interfaces associated with the local security domain. Otherwise, the border routers disable the virtual link interface and enable all interfaces associated with the local security domain.

2.3.2 Multicast Data Forwarding Over the Multicast Virtual Link

Given a security domain boundary instance in an independent state and a multicast virtual link implemented, for example, as a generic routing encapsulation tunnel, multicast packets destined for the group associated with the security domain are forwarded between an upper level security domain and the security domain through a multicast virtual link. When a security domain border router receives a multicast packet destined to the group associated with the security domain from the backbone of the upper level security domain, it is determined whether the multicast packet is received at a correct interface and whether the virtual link is an egress interface. If so, then the security domain border router forwards the multicast packet to the multicast virtual link to the security broker and other security domain border routers.

A security domain border router receives the multicast packet from the multicast virtual link and forwards the packet across the backbone of the upper level security domain via an interface associated with the upper level security domain. The security broker, on the other hand, receives a copy of the multicast packet from the multicast virtual link, decrypts and encrypts the packet, and forwards it to the local security domain. The security broker for the local security domain decrypts and encrypts the packet, and forwards it over the multicast virtual link to all security domain border routers associated with the security domain. Each security domain border router, upon receiving the packet via the multicast virtual link, forwards the packet to the backbone of the upper level security domain.

3. Group Key Distribution Protocol

3.1 Security Broker Discovery

3.1.1 Propagation of Security Broker Addresses

All security broker addresses are propagated to each router in the local security domain through the Bootstrap mechanism as specified in PIM. The propogation can be briefly described as follows.

Each security broker sends Candidate RP Advertisement (PIM message) to the Bootstrap router, a central, unique router in the local security domain. In this advertisement, the security broker claims itself as a RP (Rendezvous Point) and has the highest priority for a particular group (or group range).

The Bootstrap router receives the Candidate RP Advertisement messages, installs the addresses of the security brokers in its cache table, and propagates the addresses of all security brokers to each router in the local security domain through PIM Bootstrap messages. Each router in the local security domain receives the Bootstrap messages and installs the addresses of the security brokers in its cache table. In this manner, all routers in the local security domain have identical set of security broker addresses, each for an individual group (or group range).

Security border routers receive Bootstrap messages from the upper level security domain, encapsulate the messages, and unicast the encapsulated messages to the Bootstrap router in the local security domain. After receiving the encapsulated Bootstrap messages, the Boostrap router adds the upper level security brokers to its cache table, and then propagates the upper level security brokers to each router in the local security domain. However, the upper level security brokers has lower priorities than the security brokers in the local security domain.

The primary top regional broker address is propagated to members at the top level security domain (i.e., the Internet backbone) through manual configuration instead of Bootstrap mechanism.

3.1.2 Broker Advertisement

When a member joins a group by sending IGMP report on a local link, the IGMP querier on the link should unicast a Broker Advertisement message to the member and tell the member which broker is responsible for the particular group (or group range). A member may multicast a Broker Solicitation message to the local link to learn which broker is responsible for a particular group. In this case, the IGMP querier on the local link should unicast a Broker Advertisement message to inform this particular member. After discovering the security broker for a particular group, a member should establish a security association and a shared private-key with the security broker through certain method, such as the Internet Key Exchange (IKE) protocol, before it attempts to obtain a group key from the security broker.

3.2 Local Group Key Distribution Process

A local member of a security domain, after discovering the security broker for a particular group and establishing a security association and a shared private-key with the security broker, may attempt to participate in the secure multicast session by unicasting a Group Request message to the local security broker.

When receiving the Group Request message, if it is a request to join the secure multicast session, the security broker authenticates the Group Request message, and returns to the member a Group Reply message that contains the encrypted group key.

When the Group Request message is a request to leave, the security broker authenticates the request message, returns a Group Reply message to the leaving member for acknowledgement. In this case, the security broker should rekey the group key in the local security domain; the security broker regenerates a new group key, encrypts the new key in Group Key Refresh messages using shared private-keys with respective existing members, and sends the Group Key Refresh messages to each individual member in the local security domain.

3.3 Security Broker Behavior

When requesting a group key, a security broker behaves as a group member in the backbone of the upper level security domain. When it is not able to obtain the group key from the upper level security domain broker, the local security broker should set the boundary instance for the group to an uncertified state and thus remove the boundary instance. When the local security broker has obtained the key in the local security domain but that key is distinct from the key in the upper level security domain, it should set the boundary instance to an inherited state and configure the security domain border routers to monitor key distribution messages. Otherwise, the boundary instance should be set to independent state and the security domain border routers should disable all interfaces to lower security domains and enable their interface to the virtual link for this particular group.

The primary top regional security broker receives a Rekey Announcement from a group controller 111. The primary top regional security broker 9 obtains the top group key by exchanging a pair of Group request/Reply with the group controller.

3.4 Global Identical Rekey Process

Identical secure encapsulation enables native multicast forwarding, and thus triggers secure multicast data forwarded without translation and by taking advantage of the best routing paths. To enforce globally identical secure encapsultion, the group controller initiates the global identical rekey process. The group controller unicasts a Rekey Announcement message to the primary top regional security broker. The group controller includes its address and signature in the announcement. The primary top regional security broker receives the announcement and distributes it globally, appending its own address and signature to the announcement, and multicasting the Rekey Announcement to the group over the interne. Each security broker, when receiving such an announcement, appends its own address and signature to the announcement and forwards it downstream as multicast data.

Each security broker, when receiving a Rekey Announcement, acquires the group key in the upper level security domain, and distributes that key to the lower level security domain. As a result, the upper and lower level security domains have a shared group key.

To enforce regionally identical secure encapsulation, a security broker may also initiate the identical rekey process in a security sub domain by multicasting a Rekey Announcement to the group. A security broker, when originating the Rekey Announcement, inserts the Router Alert option in the announcement so that subsequent security domain border routers can identify this message and forward it to the relevant multicast virtual links.

Over time lower level security domains may keep rekeying group keys as a result of member leaves or as required for the relevant cryptography algorithms, and thus the key in the local security domain becomes different from that in the upper level security domain. The security broker in the upper level security domain may again initiate the identical rekey process to enforce enforce regionally identical secure encapsulation.

4. Security Broker Considerations 4.1 Obtaining Group Keys from Upper Domain 4.1.1 Sending Group Request A security broker acquires a group key before constructing an instance of a security domain. To do so, the security broker should send a Group Request to a security broker in the upper level security.

The request contains the intended lifetime, identification, and the group address. The request is authenticated using the shared private-key with the upper level security broker. The broker sets the lifetime to not-zero value to join the secure multicast session, or sets the lifetime to zero to leave the session. The security broker may retransmit the request several times if it does not receive any reply on the expiration of a retransmission timer.

4.1.2 Receiving Group Reply

When a security broker receives a Group Reply message after sending a request, it verifies the validity of the message. Incorrect checksum, unmatched identification, unmatched group address is an indication that the message is invalid. Aside, the security broker authenticates the reply using the shared private-key with the upper level security broker. After the validity check and the authentication, the reply is processed as follows.

If the reply indicates the security broker fails to obtain the key from the upper level security domain, the security broker sets the boundary instance to uncertified state. Otherwise, the security broker decrypts the group key using the shared private-key with the upper level security broker, and saves the group key. In this case, if the obtained upper level security domain group key differs from the group key for the local security domain, the security broker sets the boundary instance to independent state. If the upper level group key is the same as that for the local security domain, the security broker sets the boundary instance to inherited state.

If the boundary instance is not in uncertified state, the security broker restarts the instance timer to the lifetime in the reply. The security broker then proceeds with the boundary instance modification with the border routers as discussed in section 4.3.1.

4.2 Distributing Group Keys to Local Security Domain

4.2.1 Origination of Rekey Announcement

If a security broker intends to enforce identical secure encapsulation in its entire security domain, it multicasts a Rekey Announcement message to the security domain. The broker includes the group, its signature and public key in the announcement. A security broker, when originating the Rekey Announcement, inserts the Router Alert option in the announcement so that subsequent security domain border routers can identify this message and forward it to the relevant multicast virtual links.

4.2.2 Receiving Rekey Announcement

When receiving a Rekey Announcement, a broker verifies the validity of the message, including the checksum, group scope, and last signature on the security broker list. An invalid announcement is discarded. The announcement is forwarded as in 4.2.3. Aside, the security broker then rekeys the group key in the local security domain as follows.

To each member in the local security domain, the security broker sends a Group Refresh message that contains the group key for the upper level security domain, which is encrypted using the shared private-key with the particular member in the local security domain.

4.2.3 Forwarding Rekey Announcement

When the primary top regional domain security broker receives a Rekey announcement from the group controller, it distributes it globally, appends its own address and signature to the announcement, and multicasts the Rekey Announcement to the group associated with the security domain. A lower level security domain security broker, when receiving the announcement, appends its own address and signature to the announcement and forwards it downstream as multicast data.

4.2.4 Processing Group Request

When receiving a Group Request, a security broker verifies the validity of the message, and authenticates the message using the shared private-key with the message originator (a local member or a security broker in a sub domain).

If the lifetime is not zero, it means the originator intends to join the secure multicast session. The security broker then returns a Group Reply with the same identification and the local group key encrypted with the shared private-key. The reply includes a lifetime that may be less than that in the original request.

If the lifetime is zero, it means the originator intends to leave the secure multicast session. The security broker then returns a Group Reply simply with the same identification. In this case, the security regenerates a new group key for the local security domain. To each member in the local security domain, the security broker sends a Group Refresh message with the new group key for the local security domain, which is encrypted using the shared private-key with each individual member in the local security domain.

The security broker maintains a member database and add/update a record for each request. If there is no member in the database, the security broker may set the boundary instance for the group to uncertified state and then proceed with the boundary instance modification with the security domain border routers as in 4.3.1.

4.3 Boundary Management with Border Routers

Prior to creating boundary instances by exchange of Boundary Instance Request and Reply messages, the physical security boundary should have already been formed by the security border routers.

4.3.1 Sending Boundary Instance Request

For each boundary instance, if its state changes, the security broker multicasts a Boundary Instance Request to all security brokers to request all security domain border routers to make relevant changes. The request contains the lifetime of the boundary instance, transaction ID, the multicast address for all security routers, and the group itself. The security broker may keep transmitting the request until it receives replies from all security domain border routers.

4.3.2 Receiving Boundary Instance Reply

When the security broker receives positive Boundary Instance Reply messages from all security domain border routers, the security broker is done with configuring the boundary instance for the state. If the security broker receives negative replies from some security domain border routers, it may have to reconstruct the physical domain or may manually take other actions.

4.4 Multicast Data Forwarding

When a boundary instance for a group is in an uncertified state or an inherited state, the security broker only forwards a Rekey announcement as in section 4.2.2. When the boundary instance is in an independent state, the security broker forwards multicast packets destined for the group between the multicast virtual link and the local domain. When it receives such a packet from the multicast virtual link, the security broker decrypts the packet using the upper level security domain group key, encrypts the packet using the local domain group key, and then multicasts the packet to the members in the local security domain. When it receives, as a local member, such a packet from the local security domain, the security broker decrypts the packet using the local domain group key, encrypts the packet using the upper level security domain group key, and then forwards the packet over the multicast virtual link.

5. Security Border Router Considerations

5.1 Processing Boundary Instance Request

Each border router behaves as a filter for key distribution messages. For each received multicast packet, the security domain border router determines if there is any Router Alert option and, If so, forwards the packet between the upper level security domain and the virtual link interface. However, the securitydomain border router drops any packet received from local interfaces with the Router Alert option inserted.

5.2 Forwarding Key Distribution Messages

Each border router behaves as a filter for key distribution messages. For each received multicast packet, the security domain border router determines if there is any Router Alert option and, if so, forwards the packet between the upper level security domain and the virtual link interface. However, the security domain border router drops any packet received from local interfaces with the Router Alert option inserted.

5.3 Forwarding Multicast Packets

Each security domain border router acts as a filter for multicast data destined for the groups for which it is forwarding traffic. If a boundary instance for a group is not in independent state, the security domain border router forwards multicast packets destined for the group as multicast data. If the boundary instance is in independent state, the security domain border router forwards packets destined for the group between the upper level security domain and the local security domain through the multicast virtual link.

Whenever the security domain border router receives a packet from the upper domain that is destined to the group, if it arrives on an correct interface and the virtual link is associated with an egress interface, the security domain border router forwards it to the multicast virtual link. Whenever the security domain border router receives a packet destined to the group from the multicast virtual link, if it has interfaces associated with upper level security domains, it forwards the packet to the upper level security domains.

6. Source Node Considerations

If a source node has to encapsulate and transmit multicast packets to an intermediate router to participate in a multicast session, the source node may have to obtain a key from a security broker in the intermediate router's security domain. In this case, the source node uses a unicast message to obtain the remote group key from the remote security broker by exchanging a pair of Group request and Reply messages. Otherwise, the source node behaves as a member of the group associated with the local security domain to obtain a group key from a local domain security broker as in section 7.

7. Receiver Node Considerations

7.1 Sending Group Request

A member obtains a group key for the local security domain prior to participating in the secure group multicast session. To obtain a group key, the member sends a Group Request to the local security broker.

The request contains the intended lifetime, identification, and the group address. The request is authenticated using the shared private-key with the local security broker. The member sets the lifetime to not-zero value to join the secure multicast session, or sets the lifetime to zero to leave the session. The member may retransmit the request several times if it does not receive any reply on the expiration of a retransmission timer.

7.2 Receiving Group Reply

When a member receives a Group Reply message after sending a request, it verifies the validity of the message. Incorrect checksum, unmatched identification, unmatched group address is an indication that the message is invalid. Aside, the member authenticates the reply using the shared private-key with the local security broker. After the validity check and the authentication, if the member is granted the group key for the local security domain, the member decrypts the group key using the shared private-key with the local security broker, and saves the group key.

7.3 Receiving Group Refresh

When a member receives a Group Refresh message, it authenticates the refresh message using the shared private-key with the local security broker, decrypts the new group key, and then updates the old group key for the local security domain.

8. Group Controller Considerations

The group controller initiates the global identical secure encapsulation when creating a group. The controller unicasts a Rekey Announcement to the primary top regional security broker. The group controller includes its address and signature in the announcement.

9. Multicast Data Transmission Example

Figure 2A:
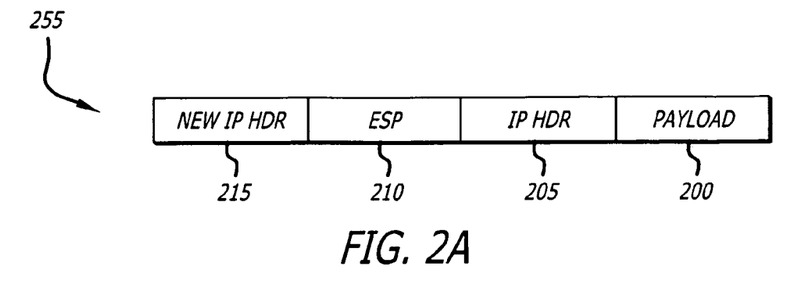
FIG. 2 is a diagram of a multicast packet format as may be utilized by an embodiment of the present invention.
Figure 2B:
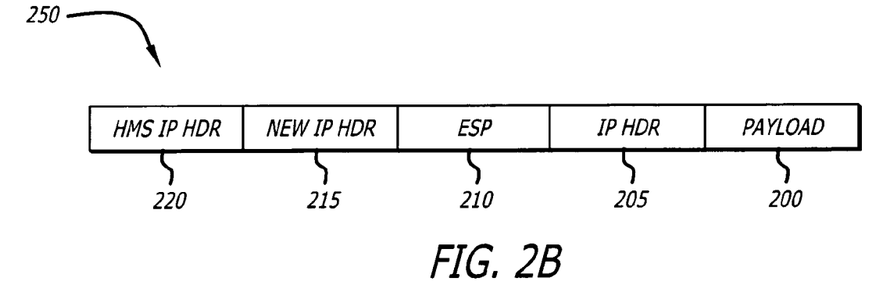

With reference to FIGS. 1, 2A, and 2B, an example is provided in which source node 105 transmits a multicast packet 255, i.e., a packet having a multicast destination address. The multicast packet has a data payload 200. Source node 105 first encrypts the packet including the data payload according to a well known security encryption algorithm, such as tunnel mode ESP, proposed by Kent, Atkinson, *Internet Draft IP Encapsulating Security Payload (ESP)*, July, 1998. In tunnel mode ESP, the network layer, e.g., Internet Protocol layer, header 205 in the multicast packet carries the ultimate source and destination addresses for the packet. Preceding the IP header 205 is an outer, or new, IP header 215 that comprises IP addresses that correspond to, for example, the IP address of a security broker or security domain border router encountered as various points in the internetwork between the ultimate source and destination nodes, and an ESP header 210.

The source node 105 transmits the multicast packet 255 with a source IP address that of the source node, and a multicast destination IP address. Both addresses are maintained in the IP header 205. Likewise, the IP addresses in the outer IP header 215 are set to the IP address of the source node and the multicast destination address. Security broker 5 receives the multicast packet transmitted by source node 105, decrypts and encrypts the packet, changing the outer IP source address to that of security broker 5, in accordance with the tunnel encapsulation protocol. The IP destination address in the new IP header remains the multicast IP address placed there by the source node. The security broker then adds, as illustrated in FIG. 2B, another IP header at 220, referred to herein as the hierarchical multicast system (HMS) IP header. In this header 220 is placed the IP source address of the security broker, just as it is placed in the new IP header 215 by source 105. The IP destination address, which defines the multicast virtual link, is either a unicast address of the security domain border router associated with this security domain, or a multicast address recognized by multiple security domain border routers, if they exist. Thus, if numerous border routers exist for the security domain in which security broker 5 resides, a multicast address recognized by the border routers is best used, so that the packet is transmitted just once by the security broker. On the other hand, if there is just one border router, the destination IP address field in the HMS IP header is set to the IP address for the appropriate interface of one of the security border routers, and the packet is transmitted. Optionally, if there are two border routers, the packet can be duplicated and sent unicast, specifying a different IP address in each packet corresponding to an IP address associated with an interface for each of the border routers. In the network of FIG. 1, it is appreciated that a multicast packet transmitted by security broker 5 would be received by border routers 4 and 6. Alternately, separate unicast packets could be transmitted, one to each of border routers 4 and 6. It is this communication between the security broker and the border routers, or between the security broker and the source, that forms the multicast virtual link.

Continuing on with the transmission of the multicast packet sourced by node 105, security border router 4 receives the packet formatted with an HMS header 220, and removes the HMS header. The border router determines to forward the packet based on the contents of the IP header and adds its own HMS header with a source IP address of security border router 4 and a destination IP address either a unicast IP address of an interface for a security broker or border router, or a multicast address recognized by the security broker and border routers in the security domain shared with security border router 4. The new IP header 215 still maintains the source IP address of security broker 5 and the destination IP address of the multicast group. The packet is then transmitted over the multicast virtual link to security broker 3 and security border router 1, both of which are members of the same security domain 210 as border router 4, in accordance with the present invention.

Security broker 3 receives the packet transmitted by security border router 4, removes the HMS header, decrypts the packet using key 5, sets the new IP source address to the IP address for security broker 3, and then encrypts the packet using the local group key 3 before transmitting the packet to the nodes in its group, including security border router 1 which is a member of security domains 210 and 310.

Figure 3:
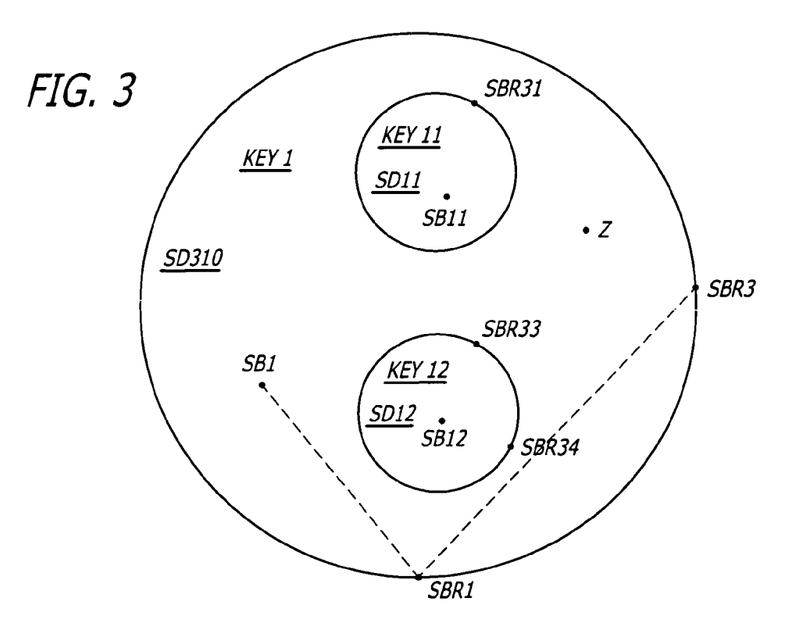
FIG. 3 is a block diagram of an embodiment of the present invention.

With reference to FIG. 3, details of security domain 310 from FIG. 1 are illustrated. The security domain 310 uses a group key 1, and includes as members security broker 1, node z, and security border routers 1 and 3. Two security sub domains exist within security domain 310, including security domains 11 and 12. Security domain 11 includes security broker 11 and security border route 31, and utilizes a local group key 11, whereas security domain 12 includes security broker 12 and security border routers 33 and 34, and utilizes a local group key 12. The multicast packet transmitted by source node 105 and forwarded by security border router 4 in security domain 210 is received, processed, and forwarded by security border router 1 in the same manner as security border router 4 did when receiving the packet from security broker 5. Security border router 1 receives the packet formatted with an HMS header 220, and removes the HMS header. The border router determines to forward the packet based on the contents of the IP header and adds its own HMS header with a source IP address of security border router 1 and a destination IP address either a unicast IP address of an interface for a security broker or border router, or a multicast address recognized by the security broker and border routers in the security domain shared with security border router 1. The new IP header 215 still maintains the source IP address of security broker 5 and the destination IP address of the multicast group. The packet is then transmitted over the multicast virtual link to security broker 1 and security border router 3, both of which are members of the same security domain 310 as border router 1.

Security broker 1 uses local group key 1. It therefore removes the HMS header from the packet received over the virtual link from security border router 1, decrypts the packet using key 3, and encrypts the packet using key 1 before sending the packet to members of the local security domain via multicast (without an HMS header) including border routers 31-34 for security sub domains 11 and 12. Security border route 34, for example, receives the packet from security broker 1, adds an HMS header with an HMS source IP address of security broker 34, and sends the packet to members of security domain 12, e.g., security broker 12 and security border router 33, via virtual links. A node such as node Z receives the packet either via a link from security border router 1 or security border routers 31 or 33.

The process continues in this manner, as the packet transits each security broker and border router between the source and destination nodes(s). Thus, the data packet is only encrypted and decrypted at the security brokers, that is, the multicast packets are tunneled across border routers defining separate security domains at the same security level, without decrypting and encrypting the packets.

What is claimed is:

1. A computer based method for distributing security keys over a network, comprising:
    partitioning the network into a plurality of security domains each forming different levels of a security hierarchy, the plurality of security domains includes an upper level security domain and a lower level security domain, each of the upper level security domain and the lower level security domain has a security key associated therewith;
    electing one or more security brokers for each of the plurality of security domains;
    selecting a primary security broker for the upper level security domain and the lower level security domain in the security hierarchy;
    using a multicast virtual link, distributing the security key from the upper level security domain in the security hierarchy by the primary security broker located in the upper level security domain at each level to the lower level security domain
    receiving at each of the security brokers at a given level in the security hierarchy the security key from the upper level security domain that is distributed by the primary security broker for the given level; and
    electing at each of the security brokers at the given level to distribute either the security key or a local security key to members of the security domain associated with the security broker.

2. The computer based method of claim 1, wherein electing a security broker for each of the security domains comprises electing a security broker for each of the highest upper and lower level security domains.

3. The computer based method of claim 2, wherein selecting a primary security broker comprises selecting one or more of the lower level security brokers to distribute the security key from the upper level security domain across the lower level security domain].

4. The computer based method of claim 3 for distributing security keys over a network, comprising:

partitioning the network into a plurality of hierarchical security domains forming a security hierarchy by partitioning the network into a highest level security domain and at least two lower level security domains, each of the highest level and lower level security domains has a security key associated therewith;

electing a security broker for each of the security domains which comprises electing a security broker for each of the lower level security domains;

selecting a primary security broker at each of the lower level security domains in the security hierarchy, the selecting of the primary security broker comprises selecting one or more of the lower level security brokers to distribute the security key from the highest level security domain across the lower level security domains, and the selecting of the one or more of the lower level security brokers to distribute the security key from the highest level security domain across the lower level security domains comprises selecting at least one of the lower level security brokers to distribute the security key from the highest level security domain to the security brokers and security border routers for the lower level security domains over the multicast virtual link without any need for translation of a multicast data stream when traversing to a lower level security domain.

5. The computer based method of claim 4, wherein distributing the security key from the upper level security domain in the security hierarchy by the primary security broker at each level to the lower level security domain than the security domain in which the primary security broker is located comprises distributing via the selected one of the lower level security brokers the security key from the highest level security domain across all security domains at the lower level.

6. The computer based method of claim 5, further comprising partitioning the lower level security domain into at least two third level security domains.

7. The computer based method of claim 6, further comprising selecting one of the third level security brokers to distribute a security key from the lower level security domain across the third level security domains.

8. The computer based method of claim 7, further comprising distributing the security key from the lower level security domain to the third level security domains via multicast virtual links so that a multicast data stream can be transmitted without any need for translation when traversing to any of the third level security domains.

9. A computer based method for distributing security keys over a network, comprising:

partitioning the network into a plurality of security domains forming a security hierarchy having a plurality of levels, the plurality of security domains includes an upper level security domain and a lower level security domain, each of the upper level and lower level security domains has a security key associated therewith;

electing a security broker for each of the plurality of security domains; selecting a primary security broker at the upper level security domain in the security hierarchy; and using a multicast virtual link, distributing the security key from the upper level security domain in the security hierarchy by the primary security broker to the lower level security domain than so that each of the security brokers at a given level in the security hierarchy receives the security key from the upper level security domain, and distributing by each of the security brokers at the given level a local security key that is rekeyed within the security domain associated with the security broker.

10. A computer based method for distributing security keys over a network, comprising:

forming a security hierarchy by partitioning the network into a plurality of hierarchical security domains of which a highest level security domain is generally partitioned into at least two lower level security domains;

selecting a primary security broker at each level other than a highest level in the security hierarchy;

electing a security broker for each of the plurality of hierarchical security domains;

distributing via the primary security broker for each level in the security hierarchy a security key from an upper level security domain across all security sub-domains at the same level in the security hierarchy as the security domain in which the primary security broker is located;

using a multicast virtual link, distributing the security key from the upper level security domain in the security hierarchy by the primary security broker at each level to a lower level security domain than the security domain in which the primary security broker is located; and distributing one of the security key or a local security key rekeyed within the security domain associated with the primary security broker to members of the security domain associated with the primary security broker.

11. The computer based method of claim 10, each of the highest and lower level security domains has a security key associated therewith.

* * * * *